United States Patent [19]

Denpou

[11] Patent Number: 4,912,936
[45] Date of Patent: Apr. 3, 1990

[54] REFRIGERATION CONTROL SYSTEM AND METHOD

[75] Inventor: Kazuo Denpou, Ibaraki, Japan

[73] Assignee: Kabushiki Kaisha Toshiba, Kawasaki, Japan

[21] Appl. No.: 176,320

[22] Filed: Mar. 31, 1988

[30] Foreign Application Priority Data

Apr. 11, 1987 [JP] Japan .................................. 62-89279
Apr. 11, 1987 [JP] Japan .................................. 62-89280

[51] Int. Cl.$^4$ ........................ G05D 23/32; H02H 7/00
[52] U.S. Cl. ........................................ 62/158; 62/230;
361/22; 361/33; 417/32
[58] Field of Search ............... 361/22, 33, 92; 62/230,
62/229, 158

[56] References Cited

U.S. PATENT DOCUMENTS

| | | | |
|---|---|---|---|
| 3,946,574 | 3/1976 | Portera | 62/230 X |
| 4,084,406 | 4/1978 | Brenneman | 62/211 |
| 4,415,943 | 11/1983 | Wortman | 361/92 X |
| 4,620,425 | 11/1986 | O'Grady | 417/32 X |

FOREIGN PATENT DOCUMENTS

58-13275  3/1983  Japan .

Primary Examiner—William E. Wayner
Attorney, Agent, or Firm—Cushman, Darby & Cushman

[57] ABSTRACT

A compressor controller of a refrigerating device comprises a power supply voltage detecting device, a voltage comparing device, and a compressor driving device. When the temperature in a compartment of the refrigerating device rises and the compressor is required to be driven to cool the compartment, the power supply voltage detecting device detects the voltage of the power supply which feeds power to the compressor. The voltage comparing device compares the power supply voltage with a reference voltage. When the power supply voltage is no lower than the reference voltage, the compressor driving device starts the compressor. The compressor controller also includes a compressor starting condition detecting device, a compressor halting device, and a voltage compensating device. The compressor starting condition detecting device detects the starting condition of the compressor by detecting the voltage or the current which is fed to the compressor by the power supply. When a compressor starting failure is detected, the compressor halting device halts the compressor immediately. Further, the voltage compensating device increases the reference voltage.

13 Claims, 6 Drawing Sheets

REFRIGERATION CONTROL SYSTEM AND METHOD

BACKGROUND OF THE INVENTION

1. Field of the Invention

The present invention relates, in general, to a controller for refrigeration. More particularly, the invention relates to a compressor controller.

2. Description of the Prior Art

A compressor of a refrigerator is operated in accordance with the temperature in a compartment thereof. The temperature in the compartment is detected by a temperature sensor which is provided in the compartment. When the temperature in the compartment is above a set temperature, the compressor is driven to cool the compartment, while the compressor is halted when the temperature in the compartment is below the set temperature. As a result, the inside of the compartment is kept within the set temperature range. An example of such a compressor control system is disclosed in Japanese Utility-Model Publication No. 58-13275, first laid open on July 8, 1978. In Japanese Utility-Model Publication No. 58-13275, two temperature sensors are provided in a refrigerator. One of the temperature sensors detects the temperature of an evaporator, causing the compressor to turn ON when the temperature exceeds a predetermined value. The other of the temperature sensors detects the temperature in a compartment where the evaporator is placed, causing the compressor to turn OFF when the temperature in the compartment drops below a set temperature.

There are some countries where the power supply voltage value fluctuates rapidly and to a great extent. With a conventional compressor control system, the compressor may fail to start when the refrigerator is used in such a country as described above, because of fluctuations of the power supply voltage. Generally, an overload relay made of a bimetallic strip cuts the power to the compressor. However, because of the bimetallic strip, the compressor may again fail to start after the overload relay reverses to a state supplying power to the compressor. Furthermore, if the overload relay fails or is slow in responding, the compressor motor may burn out, or a power supply circuit breaker may cut the power, causing a power outage.

SUMMARY OF THE INVENTION

It is an object of the present invention to provide a compressor control method and system for a refrigerating device which overcomes the problem of the compressor failing to start.

To accomplish the object described above, the controller includes, and the controlling method may utilize, a power supply voltage detecting device, a voltage comparing device and a compressor driving device. When the compressor is to be energized, the power supply voltage is detected and compared with a predetermined voltage. As long as the power supply voltage is lower than the predetermined voltage, the compressor driving device does not energize the compressor.

Even after the compressor driving device allows power to be supplied to the compressor, the present invention may check either the voltage across or the current through the compressor to determine whether it has started properly. If it has not, the compressor is deenergized.

BRIEF DESCRIPTION OF THE DRAWINGS

The present invention will be explained in detail with reference to accompanying drawings.

DETAILED DESCRIPTION OF THE PREFERRED EMBODIMENTS

Figure 1:
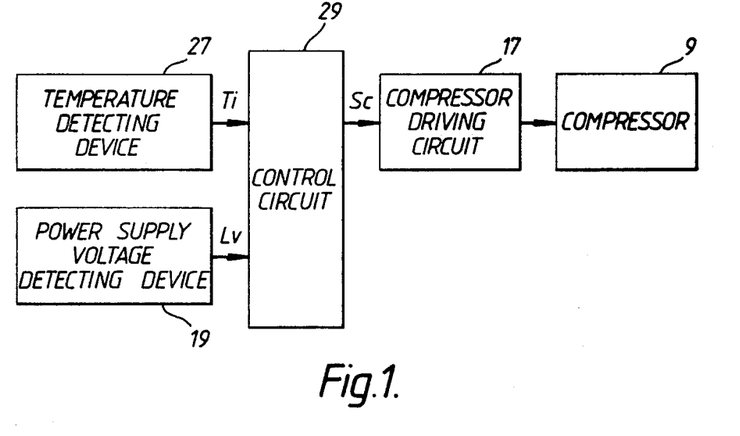
FIG. 1 is a block diagram explaining a first embodiment of the present invention.
Figure 2:
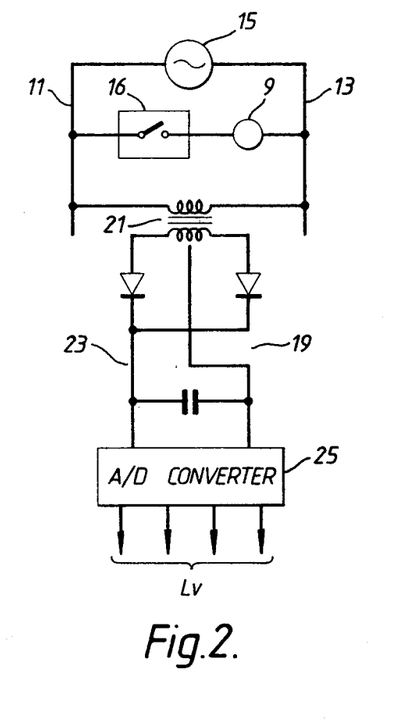
FIG. 2 is a schematic circuit diagram illustrating the first embodiment.

As is shown in FIGS. 1 and 2, a compressor 9 is connected between conductors 11 and 13 of an AC power supply 15 via a relay contact 16 in a compressor driving circuit 17. A power supply voltage detection device 19 consists of a transformer 21, a rectifier and smoothing circuit 23, and an A/D converter 25. A primary winding of transformer 21 is connected to AC power supply 15, while a secondary winding thereof is connected to rectifier and smoothing circuit 23. A/D converter 25 outputs four bits of power supply voltage data Lv corresponding to the analog DC voltage from rectifier and smoothing circuit 23.

As is shown in FIG. 1, a temperature detection device 27 outputs temperature data Ti by detecting the temperature in the compartment of the refrigerator. Temperature data Ti and power supply voltage data Lv are applied to a control circuit 29 which consists of a microcomputer. The microcomputer, including CPU, RAM, ROM, and I/0 interface, has four functions. First, the microcomputer compares temperature data Ti with a compressor starting temperature data Ton. Second, the microcomputer compares power supply voltage data Lv with a lowest compressor starting voltage data Sv stored in ROM. Third, the microcomputer outputs a compressor driving signal Sc to a compressor driving circuit 17. Receiving compressor driving signal Sc, compressor driving circuit 17 operates compressor 9. Fourth, the microcomputer judges a starting condition of compressor 9.

Figure 3:
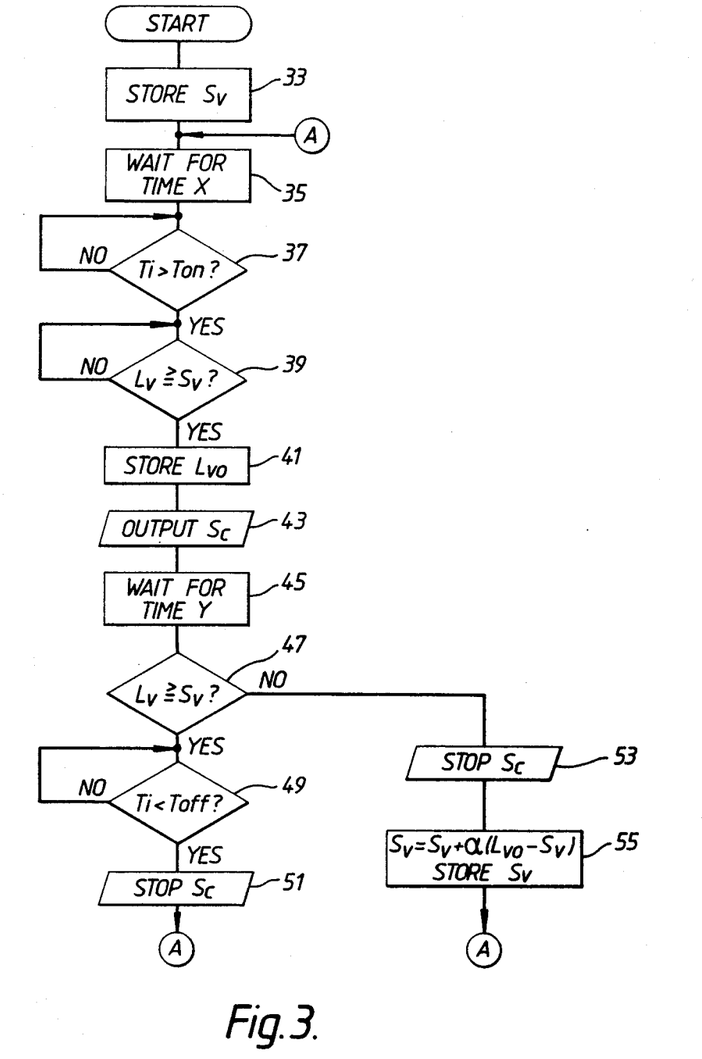
FIG. 3 is a flowchart explaining the embodiment of the present invention.

The operation of control circuit 29, specifically the microcomputer, will be explained referring to FIG. 3. In step 33, lowest compressor starting voltage data Sv stored previously in ROM is transferred to RAM. Then step 35 is executed, in which the microcomputer waits for a predetermined time period X. The predetermined time period X is usually about five minutes, which ensures that compressor 9 will start again after it has stopped. When the predetermined time period X has passed, step 37 is executed, in which a decision is made as to whether or not temperature data Ti is above compressor starting temperature data Ton, which is set by a user of the refrigerator and stored in RAM.

When temperature data Ti corresponding to the temperature in the compartment is above compressor starting temperature data Ton, step 39 is executed, in which a decision is made as to whether power supply voltage data Lv is at least the lowest compressor starting voltage data Sv. When power supply voltage data Lv detected by power supply voltage detection circuit 19 is greater than or equal to the lowest compressor starting voltage data Sv, step 41 causes power supply voltage data Lv to be stored in RAM as a reference power supply voltage data Lvo. Then step 43 causes compressor driving signal Sc to be output to compressor driving circuit 17.

Consequently, when temperature data Ti is above compressor starting temperature data Ton and power supply voltage data Lv is no lower than lowest compressor starting voltage data Sv, compressor 9 is started.

In step 45, the microcomputer waits for a predetermined time period Y during which compressor 9 would normally start properly The predetermined time period Y is usually ten seconds, during which time compressor 9 reaches a steady-state rotational speed. When time period Y has passed, step 47 determines whether the starting condition of compressor 9 is normal or abnormal by comparing a power supply voltage data Lv detected at this time with lowest compressor starting voltage data Sv.

While compressor 9 is starting, power supply voltage data Lv detected by power supply voltage detection device 19 is reduced since a large amount of starting current flows through the winding of the compressor motor. However, if the starting condition of compressor 9 is normal, after compressor 9 has reached a steady-state rotational speed and a steady-state current flows through the winding of the compressor motor, power supply voltage data Lv returns to what the power supply voltage data Lv was before starting. In contrast, if compressor 9 fails to start, power supply voltage data Lv remains reduced since an excessive current remains flowing through the winding of the compressor motor.

In step 47, when power supply voltage data Lv is no lower than lowest compressor starting voltage data Sv, the microcomputer judges that the starting condition of compressor 9 is normal and step 49 is executed, in which a decision is made as to whether or not temperature data Ti is below compressor stopping temperature data Toff, which is set by a user of the refrigerator and stored in RAM. When temperature data Ti is below compressor stopping temperature data Toff, i.e., when the temperature in the compartment is below the setting temperature, step 51 is executed, in which the generation of compressor driving signal Sc is stopped. Consequently, compressor 9 is stopped, and the operation of the microcomputer returns to step 35.

In step 47, however, when power supply voltage data Lv is lower than lowest compressor starting voltage data Sv, the microcomputer judges that compressor 9 failed to start, and step 53 is executed, in which the generation of compressor driving signal Sc is stopped. Consequently, compressor 9 is stopped, and then step 55 is executed, in which lowest compressor starting voltage data Sv is revised based on the difference between the former lowest compressor starting voltage data Sv stored in RAM in step 33 and the reference power supply voltage data Lvo stored in RAM in step 41. In other words, the lowest compressor starting voltage data Sv is set higher than what it was in accordance with, for example, a following algebraic expression: $Sv = Sv + a(Lvo - Sv)$. In this algebraic expression, $a$ is a correction coefficient whose value is between one-tenth (0.1) and five (5). The value of correction coefficient is decided in accordance with the difference between the former lowest compressor starting voltage data Sv and the reference power supply voltage data Lvo, i.e., the value of $a$ is decided to be larger as the difference between Sv and Lvo is smaller.

The revision of lowest compressor starting voltage data Sv aims at avoiding such a situation that compressor 9 fails to start again at the same power supply voltage. In other words, since the lowest compressor starting voltage data Sv is changed to be higher than what it was each time compressor 9 fails to start, the compressor driving signal Sc is never generated if the power supply voltage data Lv is the same as the former power supply voltage data, i.e., the reference power supply voltage data Lvo. So, compressor 9 is prevented from failing to start again at the same power supply voltage.

Also in step 55, after the revision of lowest compressor starting voltage data Sv, the revised lowest compressor starting voltage data Sv is stored in RAM, and the operation of the microcomputer returns to step 35.

As can be understood from the above explanation, in this embodiment, the starting of compressor 9 is permitted only when the power supply voltage is no lower than the predetermined lowest compressor starting voltage. Further, each time compressor 9 fails to start, the power supply to compressor 9 is cut immediately and the lowest compressor starting voltage is changed to be higher. Therefore, compressor 9 can be controlled so as not to fail to start, even though the power supply voltage fluctuates heavily. Further, even though compressor 9 fails to start, the compressor motor will not burn out and the circuit breaker will not be tripped.

Figure 4:
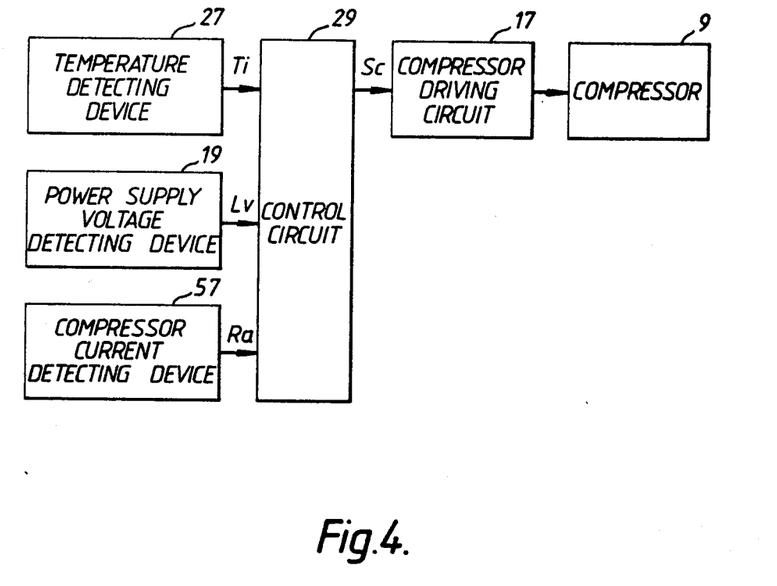
FIG. 4 is a block diagram explaining a second embodiment of the present invention.
Figure 5:
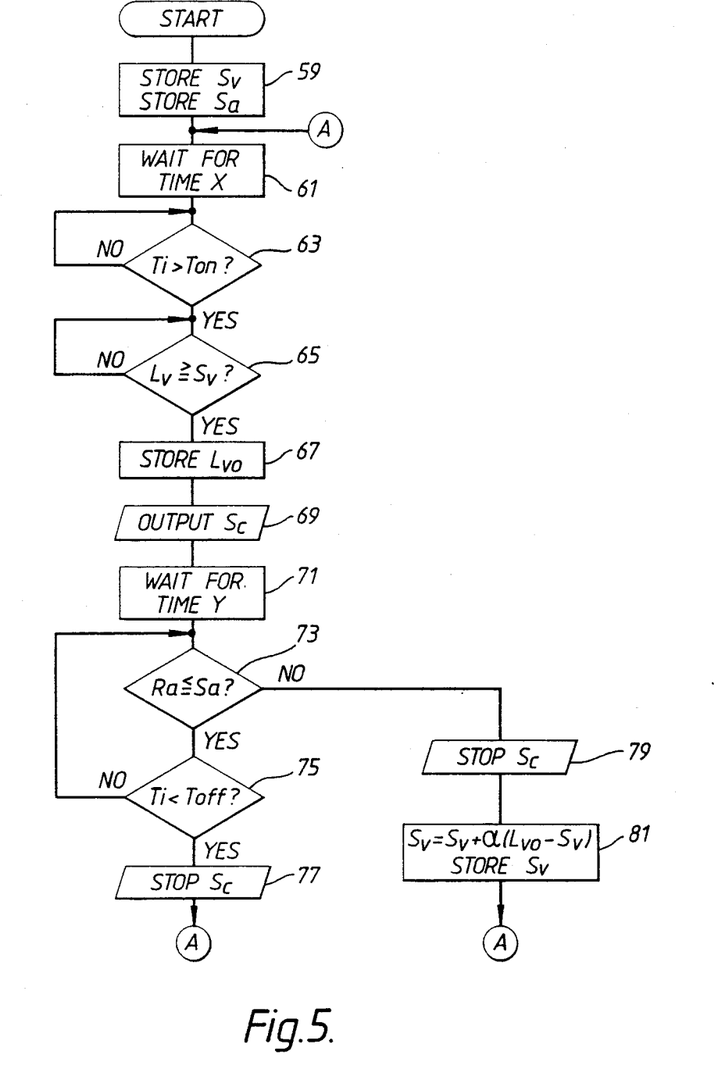
FIG. 5 is a flowchart explaining the second embodiment.

Referring to FIG. 4 and FIG. 5, the second embodiment of this invention will be described.

As is shown in FIG. 4, in this second embodiment of the present invention, a compressor current detecting device 57 is provided in addition to temperature detecting device 27 and power supply voltage detecting device 19 of the first embodiment. Compressor current detecting device 57 consists of, for example, a current choke coil, and detects an input current to the compressor motor. The operation of the microcomputer in the second embodiment is as follows.

As is shown in FIG. 5, in step 59, the lowest compressor starting voltage data Sv and a standard current data Sa, both of which are previously stored in ROM, are transferred to RAM. The standard current data Sa is decided to be the same as a rated current which flows through the winding of the compressor motor when the compressor motor rotates at a steady speed. The process from step 61 to step 71 is the same as the process from step 35 to step 45 in the first embodiment shown in FIG. 3. In step 73, the decision is made as to whether or not compressor current data Ra detected by compressor current detecting device 57 is equal to or smaller than the standard current data Sa. When the compressor current data Ra is no larger than the standard current data Sa, the microcomputer judges that the starting condition of compressor 9 is normal. Consequently, step 75 and step 77 are executed successively, and then the operation of the microcomputer returns to step 61. The process of steps 75 and 77 is the same as the process of steps 49 and 51 in the first embodiment shown in FIG. 3.

On the contrary, when the compressor current data Ra is larger than the standard current data Sa, the microcomputer judges that compressor 9 failed to start. Consequently, step 79 and step 81 are executed successively, and then the operation of the microcomputer returns to step 61. The process of steps 79 and 81 is the same as the process of steps 53 and 55 in the first embodiment shown in FIG. 3. In this second embodiment, as in the first embodiment, compressor 9 can be controlled so as not to fail to start, even though the power supply voltage fluctuates heavily. Further, even though compressor 9 fails to start, the compressor motor will not burn out and a circuit breaker will not trip.

Figure 6:
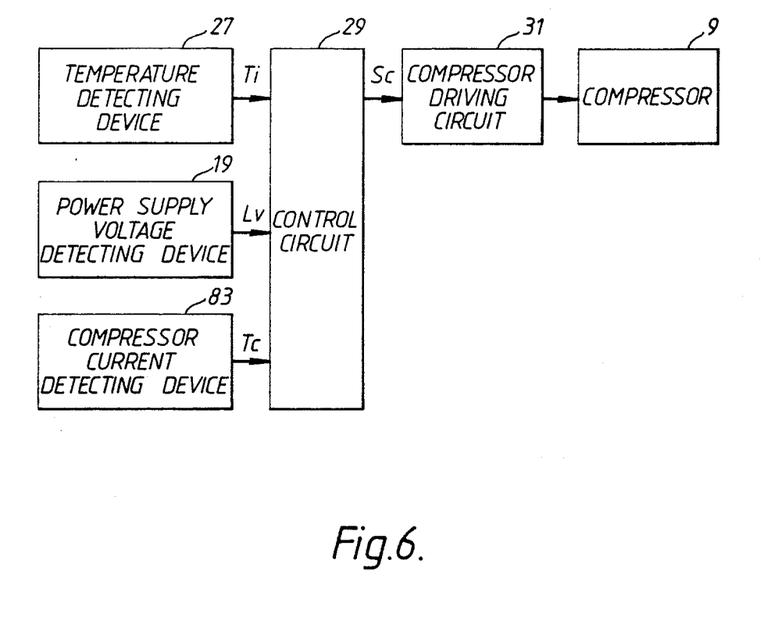
FIG. 6 is a block diagram explaining a third embodiment of the present invention.
Figure 7:
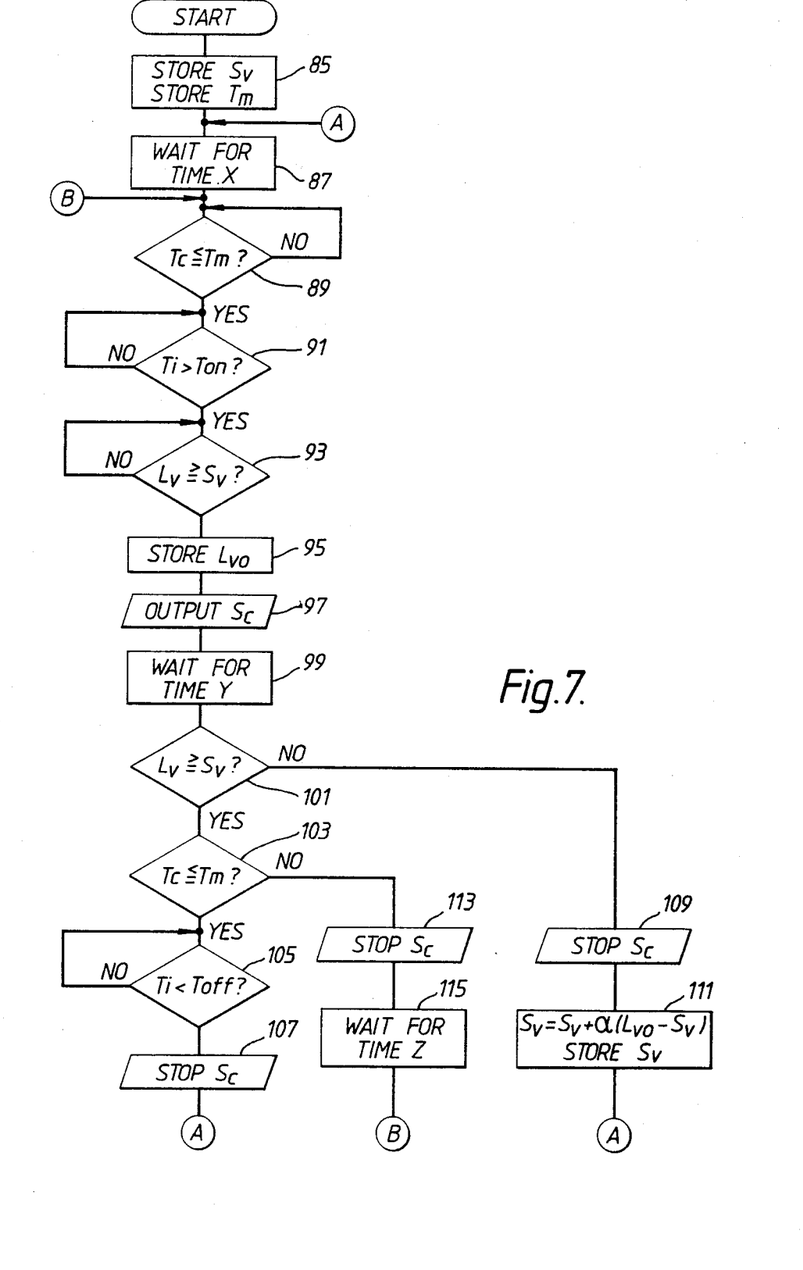
FIG. 7 is a flowchart explaining the third embodiment.

Referring to FIG. 6 and FIG. 7, the third embodiment of this invention will be described.

As is shown in FIG. 6, in this third embodiment of the present invention, a compressor temperature detecting device 83 is provided in addition to temperature detecting device 27 and power supply voltage detecting device 19 of the first embodiment. Compressor temperature detecting device 83 consists of, for example, a thermistor, and detects the temperature of the surface of a compressor case. The temperature of the surface of the compressor case rises in proportion to an amount of load, such as an amount of food stored in the refrigerator or the temperature of the atmosphere where the refrigerator is placed. The operation of the microcomputer in the third embodiment is as follows.

As is shown in FIG. 7, in step 85, the lowest compressor starting voltage data Sv and a compressor temperature upper limit data Tm, both of which are previously stored in ROM, are transferred to RAM. The operation in step 87 is the same as the operation in step 35 in the first embodiment shown in FIG. 3.

In step 89, the decision is made whether or not a compressor temperature data Tc detected by compressor temperature detecting device 83 is smaller than or equal to the compressor temperature upper limit data Tm. When the compressor temperature data Tc is no larger than the compressor temperature upper limit data Tm, step 91 is executed. The process from step 91 to step 101 is the same as the process from step 37 to step 47 in the first embodiment shown in FIG. 3. In step 101, when the power supply voltage data Lv is no lower than the lowest compressor starting voltage data Sv, step 103 is executed, in which the decision is again made whether or not the compressor temperature data Tc is lower than the compressor temperature upper limit data Tm.

When the compressor temperature data Tc is no higher than the upper limit data Tm, the microcomputer judges that the operating condition of compressor 9 is normal, and executes step 105 and step 107 successively. After the execution of steps 105 and 107, the operation of the microcomputer returns to step 87. The process of steps 105 and 107 is the same as the process of steps 49 and 51 in the first embodiment shown in FIG. 3. However, in step 103, when the compressor temperature data Tc is higher than the upper limit data Tm, the microcomputer judges that compressor 9 is under an overload condition which may cause compressor 9 to burn out, and step 113 is executed, in which the generation of the compressor driving signal Sc is stopped.

Consequently, compressor 9 is stopped and step 115 is executed, in which the microcomputer waits for a predetermined time period X having passed. This predetermined time period X is usually about twenty minutes, for which the temperature of the compressor case ordinarily falls below the upper limit of the compressor temperature. After execution of step 115, the operation of the microcomputer returns to step 89.

When the power supply voltage data Lv is lower than the lowest compressor starting voltage data Sv in step 101, the microcomputer judges that compressor 9 failed to start, and step 109 and step 111 are executed successively. The process of steps 109 and 111 is the same as the process of steps 53 and 55 in the first embodiment shown in FIG. 3. After execution of step 109 and step 111, the operation of the microcomputer returns to step 87.

In this third embodiment, as in the first and the second embodiment, compressor 9 can be controlled so as not to fail to start even though the power supply voltage fluctuates heavily, and further, even if compressor 9 fails to start, the compressor motor will not burn out and a circuit breaker will not be tripped. Furthermore, in this third embodiment, the operation of compressor 9 in an overloaded condition, which reduces the efficiency of refrigerating, can be also avoided.

The present invention has been described with respect to specific embodiments. However, other embodiments based on the principles of the present invention should be obvious to those of ordinary skill in the art. Such embodiments are intended to be covered by the claims.

What is claimed is:

1. A controller for a refrigerating device including a compressor, comprising:
   means for detecting a temperature in a compartment of the refrigerating device;
   means for detecting a voltage of a power supply feeding power to the compressor;
   processing means for: (1) comparing the temperature detected by the temperature detecting means with a set temperature, (2) comparing the power supply voltage detected by the voltage detecting means with a reference voltage,
   (3) generating a drive signal when the detected temperature is higher than the set temperature and the power supply voltage is no lower than the reference voltage, (4) determining whether the compressor has started successfully, (5) halting the drive signal when the processing means senses that the compressor has not started successfully and (6) increasing the reference voltage by and additional amount from the previously increased reference voltage each time the drive signal is halted in response to the halting function; and
   means for driving the compressor in response to the drive signal.

2. A controller for a refrigerating device according to claim 1, wherein the processing means delays performing the successful start determining function a predetermined time after the drive signal is generated and accomplishes the successful start determining function by comparing the output of the voltage detecting means with a reference voltage, the halting function being carried out when the power supply voltage is lower than the reference voltage.

3. A controller of a refrigerating device according to claim 1 further including memory means for storing the reference voltage.

4. A controller of a refrigerating device according to claim 3 further including:
   means for detecting a current flowing through the compressor; and
   processing means which, when performing the successful start determining function, compares the current detected by the current detecting means with a predetermined current.

5. A controller of a refrigerating device according to claim 4, wherein the processing means delays performing the successful start determining function a predetermined time after the drive signal is generated, the halting function being carried out when the current flowing through the compressor is greater than the predetermined current.

6. A controller of a refrigerating device according to claim 3 further including means for detecting a temperature of the compressor.

7. A controller of a refrigerating device according to claim 6, wherein the successful start determining function performed by the processing means compares the compressor temperature detected by the compressor detecting means with a predetermined temperature, the halting function being carried out when the compressor temperature is higher than the predetermined temperature.

8. A controller of a refrigeration device including a compressor, comprising:
means for detecting a temperature in a compartment of the refrigerating device;
means for detecting a voltage of a power supply feeding power to the compressor, the power supply voltage detecting means including a transformer, a rectifier and smoothing circuit, and an A/D converter, a primary winding of the transformer being connected to the power supply, a secondary winding thereof and being connected to an input terminal of the rectifier and smoothing circuit, and an output terminal thereof being connected to the A/D converter;
processing means for (1) comparing the temperature detected by the temperature detecting means with a set temperature, (2) comparing the power supply voltage detected by the voltage detecting means with a reference voltage, and (3) generating a drive signal when the detected temperature is higher than the set temperature and the power supply voltage is no lower than the reference voltage; and
means for driving the compressor in response to the drive signal.

9. A controller of a refrigerating device according to claim 8, wherein the compressor driving means includes a relay contact to be closed in accordance with the drive signal and opened when the drive signal is halted, a series circuit of the relay contact and the compressor being connected to the power supply in parallel with the primary winding of the transformer.

10. A method for ensuring the successful starting of a compressor of a refrigerating device, comprising the steps of:
comparing a voltage of a power supply for the compressor with a reference voltage;
driving the compressor when the power supply voltage is no lower than the reference voltage;
comparing again the power supply voltage with the reference voltage after the compressor has been driven for a predetermined time;
halting the compressor when the power supply voltage is no lower than the reference voltage; and
increasing the reference voltage by an additional amount from the previously increased reference voltage each time the compressor is halted in response to the halting function.

11. The method according to claim 10 further comprising the steps of:
comparing the compressor temperature with a predetermined temperature; and
halting the compressor when the compressor temperature is higher than the predetermined temperature.

12. A method for ensuring the successful starting of a compressor of a refrigerating device comprising the steps of:
comparing a voltage of a power supply for the compressor with a reference voltage;
driving the compressor when the power supply voltage is no lower than the reference voltage;
comparing current flowing through the compressor with a predetermined current;
halting the compressor when the current is greater than the predetermined current; and
increasing the reference voltage by an additional amount from the previously increased reference voltage each time the compressor is halted in response to the halting function.

13. A controller of a refrigerating device including a compressor comprising:
means for detecting a temperature in a compartment of the refrigerating device;
means for detecting a voltage of a power supply feeding power to the compressor;
processing means for (1) comparing the temperature detected by the temperature detecting means with a set temperature, the processing means delaying the performance of the temperature comparing function a predetermined time before each time it performs the temperature comparing function, (2) comparing the power supply voltage detected by the voltage detecting means with a reference voltage, and (3) generating a drive signal when the detected temperature is higher than the set temperature and the power supply voltage is no lower than the reference voltage; and
means for driving the compressor in response to the drive signal.

* * * * *